Aug. 16, 1966 W. F. GABRIEL 3,267,462

TRANSPONDER INCORPORATING NEGATIVE RESISTANCE AMPLIFIERS AND MULTIPORT DIRECTIONAL COUPLERS

Filed Aug. 13, 1963

INVENTOR

William F. Gabriel

BY

Glenn S. Ovrevik

AGENT 3,267,462

TRANSPONDER INCORPORATING NEGATIVE RESISTANCE AMPLIFIERS AND MULTIPORT DIRECTIONAL COUPLERS

William F. Gabriel, Fairfax County, Va., assignor to Keltec Industries, Inc., a corporation of Virginia Filed Aug. 13, 1963, Ser. No. 301,705
13 Claims. (Cl. 343—6.8)

This invention relates in general to object locater means and in particular to microwave object locater means of the transponder variety.

Secondary radar systems wherein a transponder at a target receives the signal and automatically transmits a return signal are well known and have been utilized extensively in blind flying applications and more recently in surveying applications. Such systems afford numerous advantages in such applications. For example, they permit return of a stronger signal and also permit coding for more positive identification of the target. Considerable effort has been devoted to the improvement of transponder devices, particularly in the areas of range extension and accuracy of transmission. However, all known transponders developed heretofore have left something to be desired in: (1) the requirement for high sensitivity, (2) the requirement for rapid pulse decay, and (3) in the requirement for a transmitted pulse having an initial position in time independent of the level of the received signal. In addition, it has been recognized that a reduction in size, weight and cost without a corresponding reduction in efficiency or reliability would be desirable in many applications. Accordingly:

It is an object of this invention to provide an improved transponder device wherein the number of component parts is minimized.

It is another object of this invention to provide an improved transponder device wherein the overall size and weight of the device is minimized.

Likewise, it is an object of this invention to provide an improved transponder device wherein the heretofore critical negative resistance amplifier-circulator matching requirement is effectively eliminated.

It is also an object of this invention to provide an improved transponder having a relatively high sensitivity at the higher microwave frequencies.

It is a further object of this invention to provide an improved transponder wherein the receiver and the transmitter are substantially isolated.

Other objects of this invention will be appreciated upon a more comprehensive understanding of the invention for which reference is had to the following specification and drawings wherein.

Figures 1, 2, 3:
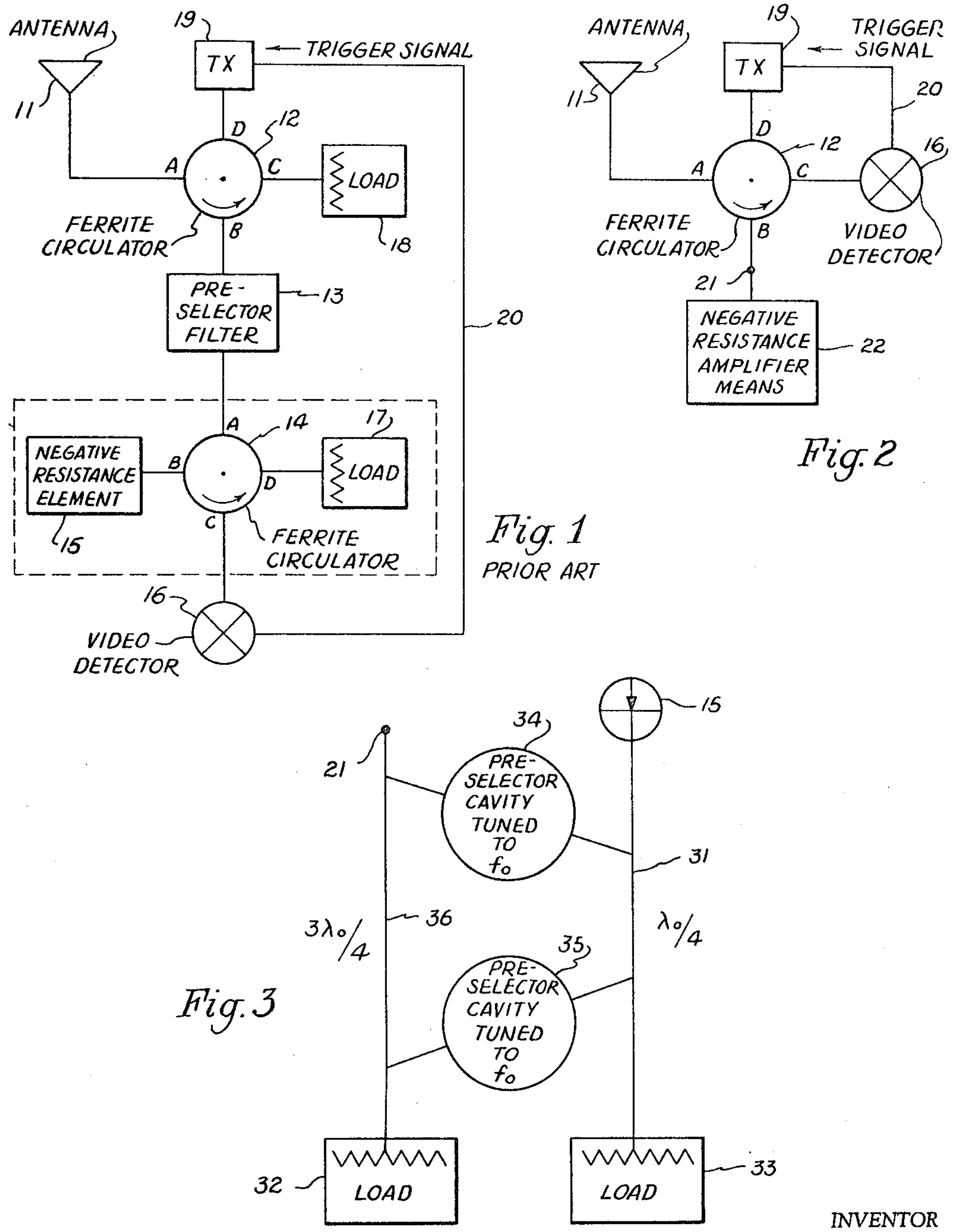
FIGURE 1 is a block diagram of a prior art microwave transponder.
FIGURE 2 is a block diagram of one embodiment of the transponder of the present invention.
FIGURE 3 is a schematic showing of a negative resistance amplifier which would be suitable for use in the embodiment of FIGURE 2.

Briefly, the device of this invention affords a microwave transponder having a high frequency sensitivity in which the preselector and the negative resistance amplifier are consolidated as one component with one input-output port such that the number of circulators required is reduced and the component parts are relatively interchangeable without critical matching considerations.

Referring now to the drawings:

FIGURE 1 is a block diagram of a typical microwave transponder of the variety incorporating negative resistance amplifiers. In this typical transponder, the antenna 11 is connected to port A of a four port ferrite circulator

12. Port B of the circulator 12 is connected to a preselector filter 13 which is connected to port A of four-port ferrite circulator 14. Port B of circulator 14 is connected to a negative resistance element 15, which may be a tunnel diode as shown, and port C of the circulator 14 is connected to a video detector 16 with port D of the circulator 14 connected to a matched load impedance 17. Port C of the circulator 12 is connected to a load impedance 18 and port D of the circulator 12 is connected to the transmitter 19.

In operation, a signal received at the antenna 11 is directed via port A of the circulator 12 to port B thereof, thence via narrow band preselector filter 13 to port A of circulator 14. Preselector filter 13 is a band-pass filter which allows only signals of the frequency of interest to pass through and be utilized. Matching load termination 18 is provided at port C of circulator 12 to absorb any reflections from port B and prevent mixing of the incoming signals from antenna 11 with the outgoing signal from transmitter 19. From port A of the circulator 14 the signal travels via port B to the negative resistance element 15 where it is amplified and then sent via port B and port C of the circulator 14 to the video detector-amplifier 16. Matching load termination 17 is connected to port D of circulator 14 to prevent reflections from reaching input port A. Thereupon the detected signal is amplified as a narrow electrical pulse, and this amplified pulse is sent via signal transfer means 20 to trigger the transmitter 19. Whereupon, the transmitter 19 emits a selected information signal output which is sent via ports D and A of circulator 12 to the antenna 11.

In this prior art transponder, the matching between the negative resistance element 15, the circulator 14 and the load impedance 17 is highly critical and it is common practice to group these elements, as indicated by the dashed line, in a "black box" arrangement with one input port and one output port, the ports A and C of circulator 14, respectively.

In the embodiment of the present invention shown in FIGURE 2, the antenna 11 is connected to port A of ferrite circulator 12. Port B of circulator 12 is connected to input-output port 21 of the negative resistance amplifier-filter means 22, port C of the circulator 12 is connected to video detector 16 and the transmitter 19 is connected to port D of the circulator 12.

As shown in the embodiment of FIGURE 3, the amplifier-filter means 22 may consist of a negative resistance element 15, a 1/4λ line section 31, load impedances 32 and 33, preselector filter means 34 and 35, 3/4λ line section 36 and input-output port 21.

In the operation of the embodiment of FIGURE 2, a signal received at the antenna 11 is directed via port A of the circulator 12 to port B thereof, thence to negative resistance amplifier 22 via port 21 thereof, where the signal is passed first via the narrow band filter 34 to the negative resistance element 15 and amplified thereby. The amplifier signal is passed via the 1/4λ line section to narrow band filter 35 and then via the 3/4λ line section 36 to the input-output port 21. The amplified signal incident on port B of circulator 12 is sent via port C of the circulator 12 to video detector 16. Thereupon the output of detector 16 is amplified as a video pulse and this video pulse is sent via signal transfer means 20 to trigger the transmitter 19 which, as in the prior art embodiment of FIGURE 1, emits a wave energy signal which travels via ports D and A of the circulator 12 to radiate via antenna 11.

It will be appreciated that in the embodiment of the invention shown in FIGURE 2, the negative resistance amplifier serves not only to amplify the received signal, but also as its own signal selector. The filtering feature and other features of the negative resistance amplifier can best be understood by a detailed consideration of the block schematic diagram shown in FIGURE 3. As shown in the diagram, the input-output port 21 and the load impedance 32 are matched across a 3/4λ transmission line 36 and the negative resistance element 15 and the load impedance 33 are matched across a 1/4λ transmission line 31, λ being the wavelength of the desired frequency $f_0$. The preselector filter means 34 and 35 interconnect transmission lines 36 and 31 such that a signal applied to port 21 is passed via filter means 34 and via transmission line 36, filter means 35 and transmission line 31 to arrive at the negative resistance element 15 in phase. Upon amplification by the element 15, which, in the case of a tunnel diode, may provide a 15 db gain, the signal returns in phase via the same paths to the port 21.

By the circuitry of FIGURE 3, the broadband negative resistance element 15 is only subject to frequencies within a narrow band as determined by the characteristics of the filter means 34 and 35. It is understood, of course, that the filter means may be cavity devices having inherent capacitive and inductive characteristics, as shown, but it is not essential that cavity devices be employed and other filter means operative to pass a selected narrow band at the operating frequency may be substituted as desired. For example, a simple LC tank circuit might be substituted in selected applications of the device of this invention. It is important, however, that the filter means 34 and 35 be substantially identical in effect on the signal both before and after amplification. Consequently, it is generally advisable that structurally identical filter means be employed and in the event the filter means are variable, each should be varied in comparable manner to insure the desired balance condition.

In the case of filter means of the tuned cavity variety, tuning may be accomplished by any conventional means such as screws, slugs, etc. It is not essential, of course, that any means be provided for varying the operating characteristics of the filter and a fixed frequency filter means might well serve the several purposes in many applications. Moreover, the negative resistance element 15 may be of the tunnel diode variety, as shown, but other types of negative resistance devices, including many forms of avalanche or minority storage devices, may be substituted as desired.

Whereas the circuitry intermediate the negative resistance element 15 and the input-output port 21 is basically that of a directional filter, it is within the purview of this disclosure to substitute directional filters of other variety in selected applications. For example, it may be advantageous in some cases to employ waveguide devices which serve in a directional filter capacity instead of devices of the coaxial line-cavity variety.

In addition, it is within the purview of this disclosure to operate the transponder of this invention at other than microwave frequencies. In such instance, of course, other appropriate circulator devices, not shown in the drawings, which serve the same directional function as the microwave circulator 12 would be required.

Accordingly, the claims appended hereto are to be construed and interpreted in the broadest sense frequency-wise. That is, terms common to the microwave art, such as "ports," are not to be construed as restricting the invention to microwave devices. In this instance, for example, the term "port" is intended to describe not only microwave structure but also all comparable input and/or output structure and the like including all appropriate two terminal means across which an input signal may be applied or an output signal may be taken.

It has been found that the transponder of this invention, employing a directional filter of the coaxial line-cavity variety, has a high undesired signal rejection characteristic and that it permits unconditionally stable loading of the negative resistance device at all frequencies from D.C. to 20 kmc. It is understood, of course, that 20 kmc. is not a critical frequency limitation and that the actual upper frequency limit is largely determined by the negative resistance element 15. Also, the depicted embodiment of this invention provides the matched load which the circulator 12 requires to insure protection of the video detector 16 against possible damage from transmitter power reflected back into the system from a mismatched antenna. Moreover, the signal transfer means 20 which interconnects the video detector 16 and the transmitter 19 may be other than a direct electrical connection, as indicated, and any suitable trigger signal relay means may be substituted therefor, if desired.

Finally, it is understood that this invention is only to be limited by the scope of the claims appended hereto.

What is claimed is:

1. A transponder responsive to receipt of a first selected wave energy signal comprising a multiport nonreciprocal directional coupler having at least four ports; antenna means, means connecting said antenna means to a first port of said multiport directional coupler; negative resistance amplifier means having a single input-output port and adapted to amplify said first selected wave energy signal; means connecting said negative resistance amplifier via said single input-output port thereof to a second port of said multiport directional coupler; signal detection means having at least one input port and at least one output port adapted to produce an output signal in response to said first selected wave energy signal, means connecting said one input port of said signal detection means to a third port of said multiport directional coupler; transmitter means having at least one input port and at least one output port; means for applying said output signal of said signal detection means to said one input of said transmitter means; said transmitter means adapted to generate a second selected wave energy signal in response to said output signal of said signal detection means, means connecting said transmitter means via said one output port thereof to a fourth port of said multiport directional coupler; said directional coupler adapted such that an input signal incident on said first port is directed to said second port, an input signal incident on said second port is directed to said third port, and an input signal incident on said fourth port is directed to said first port whereby transmission of said second selected wave energy signal via said antenna means occurs upon receipt of said first selected wave energy signal via said antenna means.

2. A transponder as defined in claim 1 wherein said first and second selected wave energy signals are microwave signals and said directional coupler is a microwave circulator.

3. A transponder as defined in claim 2 wherein said microwave circulator is of the ferrite material variety.

4. A transponder as defined in claim 3 wherein said microwave circulator is a four-port circulator.

5. A transponder as defined in claim 4 wherein said negative resistance amplifier embodies a negative resistance element of the tunnel diode variety.

6. A transponder as defined in claim 4 wherein said negative resistance amplifier includes filtering means adapted to pass said first selected wave energy signal.

7. A transponder as defined in claim 5 wherein said negative resistance amplifier includes filtering means adapted to pass said first selected wave energy signal.

8. A transponder as defined in claim 7 wherein said filtering means is electrically connected intermediate said negative resistance element and said single input-output port of said negative resistance amplifier means.

9. A transponder as defined in claim 8 wherein said signal detection means is of the video detector variety and said output signal thereof is a video pulse.

10. A transponder responsive to receipt of a first selected wave energy signal comprising a multiport nonreciprocal directional coupler; antenna means, means connecting said antenna means to a first port of said multiport directional coupler; negative resistance means adapted for negative resistance operation, said negative resistance means operative to produce an output signal in response to a selected characteristic of said first selected wave energy signal, means connecting said negative resistance means to a second port of said multiport directional coupler; signal detection means adapted to produce an output signal in response to the output signal of said negative resistance means; transmitter means having at least one input port and at least one output port; means for applying said output signal of said negative resistance means to said signal detection means; means for applying the output signal of said signal detection means to said one input of said transmitter means; said transmitter means adapted to generate a second selected wave energy signal in response to said output signal of said signal detection means, means connecting said transmitter means via said one output port thereof to a third port of said multiport directional coupler; said directional coupler adapted such that an input signal incident on said first port is directed to said second port, and an input signal incident on said third port is directed to said first port whereby transmission of said second selected wave energy signal via said antenna means occurs upon receipt of said first selected wave energy signal via said antenna means.

11. A transponder as defined in claim 10 wherein said first and second selected wave energy signals are microwave signals and said directional coupler is a microwave circulator.

12. A transponder as defined in claim 11 wherein said microwave circulator is of the ferrite material variety.

13. A transponder as defined in claim 11 wherein said negative resistance means is of the tunnel diode variety.

References Cited by the Examiner

UNITED STATES PATENTS

| | | | |
|---|---|---|---|
| 3,184,737 | 5/1965 | Child | 343—6.8 |
| 3,187,258 | 6/1965 | Zolnik | 343—6.8 X |
| 3,195,051 | 7/1965 | Chang | 333—1.1 X |
| 3,208,003 | 9/1965 | Sterzer | 333—10 X |

CHESTER L. JUSTUS, *Primary Examiner.*

P. M. HINDERSTEIN, *Assistant Examiner.*